US008101893B2

(12) United States Patent
Bogdan

(10) Patent No.: US 8,101,893 B2
(45) Date of Patent: Jan. 24, 2012

(54) VESTIBULE APPARATUS

(75) Inventor: Zoltan Bogdan, Crestwood, KY (US)

(73) Assignee: Thermex-Thermatron, LP, Louisville, KY (US)

( * ) Notice: Subject to any disclaimer, the term of this patent is extended or adjusted under 35 U.S.C. 154(b) by 1052 days.

(21) Appl. No.: 11/970,910

(22) Filed: Jan. 8, 2008

(65) Prior Publication Data

US 2009/0173733 A1 Jul. 9, 2009

(51) Int. Cl.
*H05B 6/78* (2006.01)
*A23L 1/00* (2006.01)

(52) U.S. Cl. ........ 219/741; 219/699; 219/700; 426/523; 99/386

(58) Field of Classification Search .......... 219/698–701, 219/741–742, 744; 126/20, 19, 21 R, 273.5; 426/523, 243, 510; 99/386, 443 C, 451, 99/DIG. 14
See application file for complete search history.

(56) References Cited

U.S. PATENT DOCUMENTS 3,624,335 A * 11/1971 Dench .......................... 219/699
3,665,141 A * 5/1972 Schiffmann et al. .......... 219/744
4,176,267 A * 11/1979 Rueggeberg ................. 219/699

* cited by examiner

*Primary Examiner* — Quang Van
(74) *Attorney, Agent, or Firm* — Buchanan Ingersoll & Rooney PC

(57) ABSTRACT

A vestibule for use with a microwave oven having a conveyor mechanism passing there-through is designed to prevent microwave radiation from escaping to the surrounding atmosphere. The vestibule includes a choke region and a paddlewheel region with a trap region located directly there-between. The choke region includes a series of quarter wave choke networks or devices and the trap region includes a body having quarter wave chokes with microwave absorbent materials disposed therein which absorb microwave radiation that has passed through the choke region. The paddlewheel region includes at least two pairs of paddlewheels that are synchronized with the conveyor mechanism and each other to permit individual products to enter an open end of the vestibule while preventing microwave radiation from escaping therefrom. The paddlewheels are synchronized such that while one pair of paddlewheels is in an open state, the other pair is in the closed state.

14 Claims, 7 Drawing Sheets

VESTIBULE APPARATUS

BACKGROUND OF THE INVENTION

1. Field of the Invention

The present invention relates to a vestibule which can be attached to a microwave oven which processes products, wherein the vestibule prevents or significantly reduces the amount of microwave radiation escaping into the atmosphere.

2. Discussion of Related Art

Conventional heating or drying typically includes convectional or a combination of convectional and radiative gas or electric resistance heating that is commonly used in the manufacturing of certain materials, such as ceramics. However, the slow heating rate and poor temperature control associated with such conventional heating methods results in high energy consumption and inconsistent product quality. Furthermore, using both of these modes of heating typically results in thermal differences within the body of the processed material because the heat is only applied to the exposed surface of the material from which the product is manufactured. Moreover, the thermal conductivity of the material affects the temperature beneath the exposed surface of the material to the core of the material, which corresponds to the center of the products body.

Heating by microwave radiation has become a popular technique for accelerating the drying process of the products. Compared with convectional heating, microwave heating provides a higher heating rate with good penetration, better temperature control, lower energy consumption, and potentially better quality products. Furthermore, the use of microwave energy provides a uniform application of the energy to the entire product body. Also, microwave heating is significantly faster than the aforementioned conventional methods.

Although microwave heating has proven to be faster and more efficient than conventional heating techniques that use hot air or gases, a major disadvantage of microwave heating in a continuous microwave oven is the control of microwave radiation being emitted into the environment. Such microwave emissions must be controlled in order to comply with emissions regulations established by relevant governmental regulatory agencies (e.g., OSHA, FCC, CEPT). It is preferable that microwave driers operate with nearly zero microwave emissions into the surrounding environment. Typically, the shielding of microwaves in such operations is accomplished by using attenuation tunnels, water traps, and metallic (e.g., aluminum) curtains. Although these devices are effective in most applications, there is an inherent limitation as to the size and shapes of the products which can be heated by the microwave oven associated with the aforementioned shielding device. Further, such shielding devices limit the manipulation of the products passing through the microwave oven, which directly affects the ability of the products to be heated properly and uniformly while being conveyed through the oven.

SUMMARY OF THE INVENTION

It is an aspect of the present invention to provide a vestibule that can be attached, or is attached, to a microwave oven that continuously heats products being conveyed there-through and which prevents microwave radiation from escaping into the environment.

It is another aspect of the present invention to provide a vestibule that efficiently contains and reduces microwave emissions into the surrounding atmosphere using several different integrated techniques. The vestibule preferably will include a choke section located immediately adjacent and in direct contact with an opening defined in the microwave oven. The choke section is preferably configured with materials which increase and/or maximize the impedance of the microwave radiation propagating through the vestibule. A trap section is located immediately adjacent and in direct contact with the choke section. The trap section is preferably configured to include materials which absorb the microwave radiation that has propagated through or past the choke section. A paddlewheel section is located immediately adjacent and in direct contact with the trap section. The paddlewheel section preferably includes at least two pairs of paddlewheels that are designed to shield any residual microwave radiation that has propagated through or past the choke and trap sections.

Another aspect of the present invention is the ability to manipulate, e.g., rotate around a horizontal and/or vertical axis, the products while being transported through the microwave oven. Preferably, the products are being held by a holder that operationally connects the products to a conveyor mechanism, e.g., a conveyor belt, such that the products are being manipulated while being heated and/or dried by the microwave oven.

According to another aspect of the present invention, the products are transported through the vestibule and microwave oven without being directly touched by any of the devices or components other than the holder, thereby preventing any unwanted blemishes from being created on the surface of the products during the process.

The above and other aspects, features and advantages of the present invention will become apparent from the following description of the preferred embodiment(s) taken in conjunction with the accompanying drawings.

DETAILED DESCRIPTION OF THE PREFERRED EMBODIMENTS

Figure 1A:
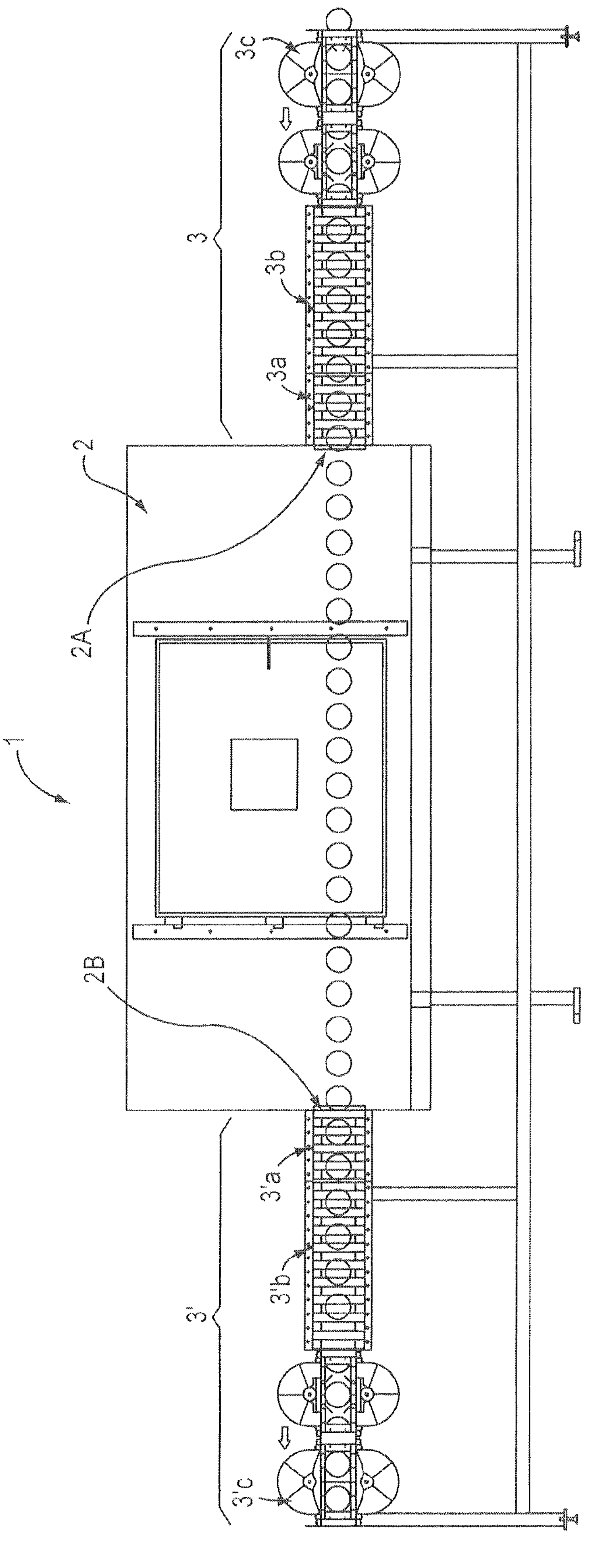
FIG. 1A is a front elevation view of the vestibule of the present invention associated with a microwave oven according to a preferred embodiment.

Referring to FIG. 1A, a front elevation view of the inventive vestibules 3 and 3' are illustrated in conjunction with a conveyorized microwave oven 2 to form a drying apparatus 1 used to process solid products, such as ceramic or glass goods. As shown in FIG. 1A, the vestibule 3 can be attached to an in-feed opening/end 2*a* (entrance) and vestibule 3' can be attached to an out-feed opening/end 2*b* (exit) of the microwave oven 2. Moreover, it should be noted that the inventive vestibules 3 and 3' are designed to be compatible with any known or later developed microwave oven or source that emits or radiates energy that is to be attenuated or otherwise prevented from escaping into the environment. In other words, the microwave oven 2 described herein is merely exemplary and it is within the scope of the present inventive vestibules 3 and 3' to be used with any other source of electromagnetic energy that needs to be blocked from escaping into the ambient atmosphere (environment). In view of the above, the particulars of the drying apparatus 1 and, specifically, the microwave oven 2, will be omitted here-from except for the details needed to understand the inventive vestibules 3 and 3'.

For example, it is envisioned that the microwave oven 2 with which the vestibules 3 and 3' are used includes at least four side walls, a top wall and a bottom wall. One of the four side walls should include the entrance 2*a* and a side wall directly opposite the entrance 2*a* should include the exit 2*b*. The direction from the entrance 2*a* to the exit 2*b* of the microwave oven 2 will define the overall flow direction of the solid products being processed by the drying apparatus 1. The walls of the microwave oven 2 are presumed to contain appropriate thermal insulation to function properly when operated at higher temperatures and in a manner well-known to those of ordinary skill in the industry, as well as to be made of a microwave-impermeable, non-magnetic material which exhibits a high electrical conductivity and preferably metal that is resistant to oxidation within a well-known and predetermined working temperature range. Furthermore, the microwave oven 2 should also be configured to receive a conveyance mechanism, such as a conveyor belt 4, that passes there-through along the flow direction.

Looking at FIG. 1A, the flow direction of the exemplary embodiment of the present invention illustrated therein is in a right to left direction. As such, an entrance vestibule 3 is disposed in an abutting relationship with an opening, such as the entrance 2*a*, of the microwave oven 2. It is also preferable that an exit vestibule 3' be in an abutting relationship with the other opening, such as the exit 2*b*, of the microwave oven 2.

Since the structure of each vestibule 3 and 3' contains the identical components having identical structural configurations, with the only difference between the vestibules 3 and 3' being the order of arrangement of the different sections making up the vestibules 3 and 3' relative to the flow direction, the following discussion will focus on the structure of the entrance vestibule 3 and omit discussion regarding the structure of the exit vestibule 3' in order to avoid redundancy.

The entrance vestibule 3 includes three sections, the first section is a choke section 3*a* that is adjacent to and abuts the entrance 2*a* of the microwave oven 2. A paddlewheel section 3*c* is adjacent to the choke section 3*a* with a trap section 3*b* disposed directly between the choke section 3*a* and the paddlewheel section 3*c*. The choke section 3*a*, trap section 3*b* and paddlewheel section 3*c* are in communication with each other via the conveyor belt 4 passing through each of the sections. Overall, the vestibule 3 is configured to preclude or at least significantly minimize any microwave energy from leaking to the ambient atmosphere when the vestibule 3 is attached to the microwave oven 2. The product P conveyed through the drying apparatus 1 first pass through the entrance vestibule 3, then the microwave oven 2 and then out the exit vestibule 3'. Each product P is secured by a holder 5 that is operationally connected to the conveyor belt 4 such that the conveyor belt 4 transports each product P.

Figure 2:
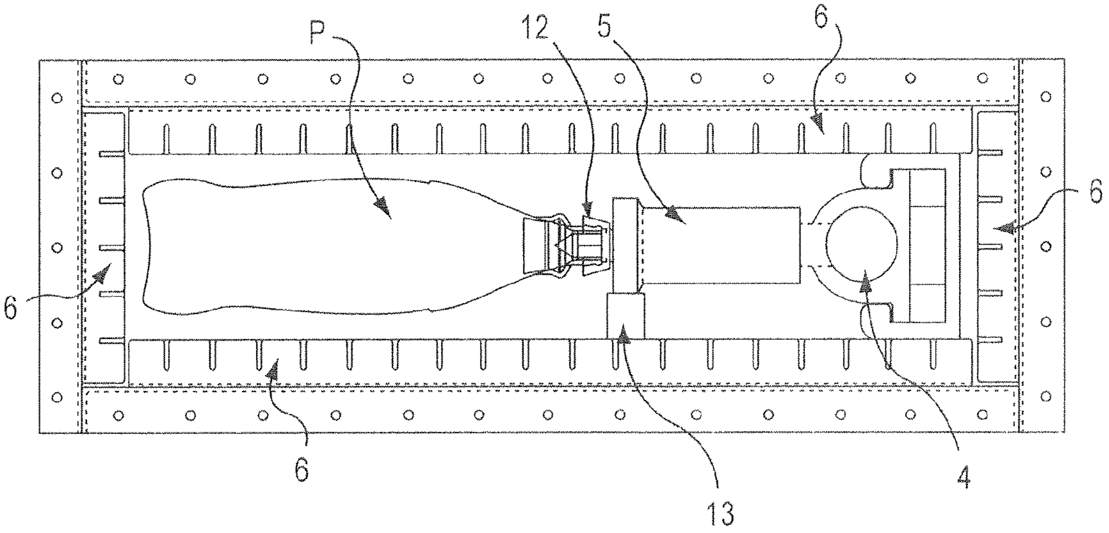
FIG. 2 is a cross-sectional view of the choke section 3*a* of the vestibule.

The section of the vestibule 3 closest to the entrance 2*a* of the microwave oven 2 is the choke section 3*a*, which is designed to stop or at least attenuate the microwave energy emitted by the microwave oven 2 propagating through the vestibule 3. A cross-sectional view of the choke section 3*a* is illustrated in FIG. 2. In particular, the choke section 3*a* comprises a plurality of quarter wave choke devices 6 arranged in a series to define a network of such devices 6 and which increase the impedance capability of the vestibule 3 at the operating frequency of the microwave oven 2.

Each quarter wave choke device 6 reduces and, where possible, attenuates the energy level of the microwave energy waves passing there-through. The network defined by the plurality of quarter wave choke devices 6 may be constructed from any number of suitable electrically conductive materials. However, in view of cavity performance standards and design limitations, it is preferable that each quarter wave choke device 6 be manufactured from a metal such as stainless steel or aluminum.

It should be noted that microwave energy is transmitted and applied through electromagnetic waves. The higher the energy level of the microwave energy, the higher the environmental leakage will be through any non-cutoff opening in the microwave oven. The inventive vestibule 3 has been developed to prevent human exposure to the microwave energy under conditions imposed by the required process for manufacturing certain products. The choke section 3*a* having the network of quarter wave choke devices 6 is a component of the vestibule 3.

The network of quarter wave choke devices 6 provides a relatively simple and passive technique for attenuating the incident microwave energy emitted from the microwave oven 2. As such, the network of quarter wave choke devices 6 creates an initial or first high impedance path that obstructs the propagation of microwave energy waves emitted by the microwave oven 2. While it is preferable that all of the microwave energy waves emitted by the microwave oven 2 be obstructed by the network, it is understood that all of the microwave energy waves emitted by the microwave oven 2 and passing through the choke section 3*a* will not be obstructed (or eliminated) by the network and that the choke section 3*a* provides the important function of reducing the amount and intensity (level) of the microwave energy waves passing there-through. The network of quarter wave choke devices 6 in the choke section 3*a* attenuates the microwave energy escaped from the microwave oven to a much lower level.

Figure 1B:
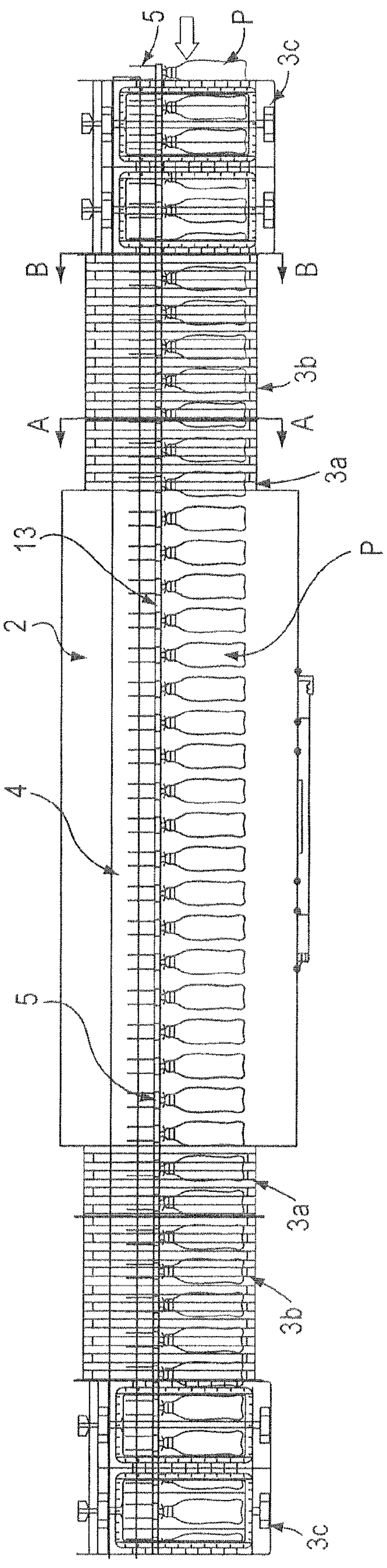
FIG. 1B is a plan or top view of the vestibule and microwave oven illustrated in FIG. 1A.
Figure 1C:
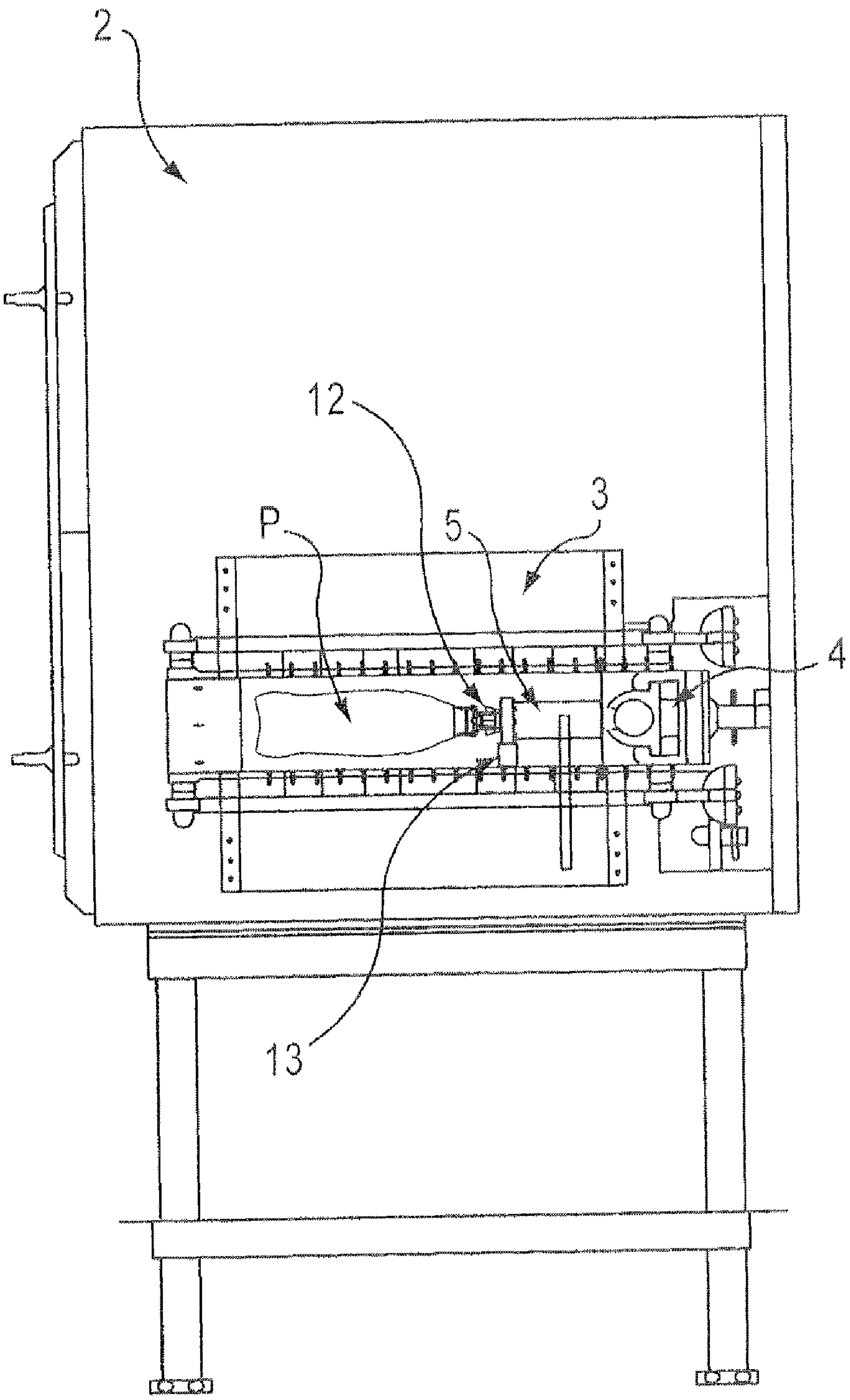
FIG. 1C is an in-feed end view of the vestibule and microwave oven illustrated in FIGS. 1A and 1B.

Referring to FIG. 2, it can be seen that while each product P is passing through the choke section 3*a*, the product P is securely retained by a holder 5 that is operationally connected to the conveyor belt 4. As illustrated in FIG. 1B, which is a plan view of the drying apparatus 1, the conveyor belt 4 and holders 5 travel along the flow direction and pass through the vestibule 3 as well as the microwave oven 2.

Returning to FIG. 2, it can be seen that the product P is illustrated as being held in a horizontal direction such that a longitudinal axis of the product P is orthogonal, i.e., extends left to right, relative to an axis of the flow direction. While the illustrated arrangement of the product P is a preferred arrangement, it should be noted that it is within the scope of the present invention for the conveyor belt 4 and holders 5 to hold and convey the product P through the drying apparatus 1 such that the longitudinal axis of the product P is orthogonal in a top to bottom direction relative to the axis of the flow direction as well as oblique relative to the axis of the flow direction.

Figure 3:
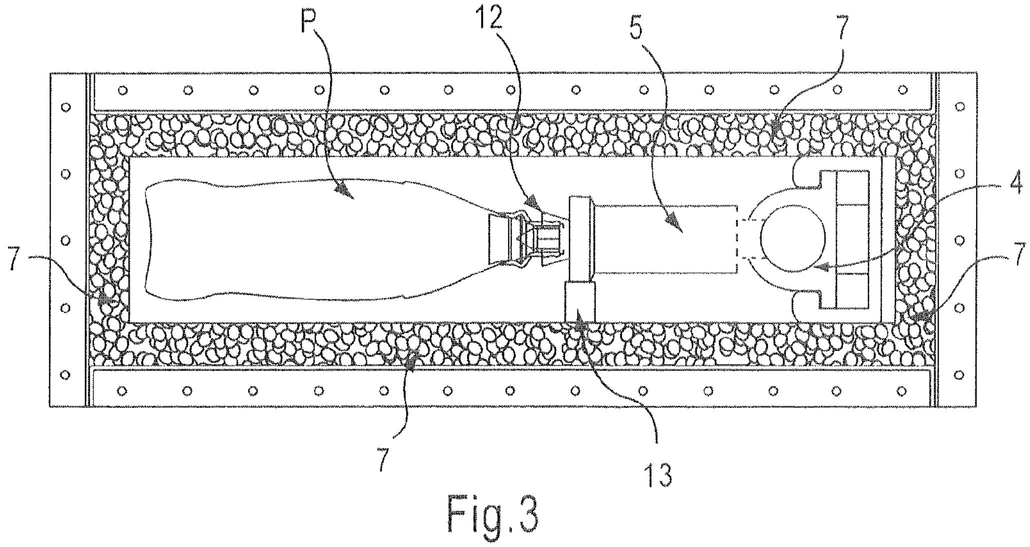
FIG. 3 is a cross-sectional view of the trap section 3*b* of the vestibule.

A cross-sectional view of the trap section 3*b* is illustrated in FIG. 3. The trap section 3*b*, which is directly next to the choke section 3*a*, is configured to absorb the highest degree or amount of microwave energy waves passing through the choke section 3*a*. In other words, after the choke section 3*a*, the trap section 3*b* provides the next level of attenuation as the microwave energy passes through the vestibule 3.

In particular, like the choke section 3*a*, the trap section 3*b* uses similar choke technology but combines the choke technology with the use of microwave absorptive material 7 that is provided along and covers the entire inner surface area of the trap section 3*b* (FIG. 3). The microwave absorptive material 7 is intended to absorb the energy and prevent it from escaping through the vestibule 3 by converting the electromagnetic energy into heat energy by heating the microwave absorptive material 7.

Preferably, the microwave-absorbent material 7 is a silicon carbide-based composition, formulated to absorb the microwave energy that has passed through the choke section 3*a* and dissipates the absorbed microwave energy or radiation as heat to the ambient atmosphere. It is within the scope of the invention for the outer surface of the trap section 3*b* to be cooled by using a cooling agent, such as air, water and the like, if the microwave oven 2 applies a high power field density to the product, wherein the field density is determined for the specifications of each system. In view of such, silicon carbide composition is still preferable because of its solid form, property adjustability, availability, and ease of use. Furthermore, should the level of microwave energy radiated from the microwave oven 2 become excessive due to the lack of or diminished amount of product P in the oven 2, that is, when the drying apparatus 1 is in an unloaded or extremely low, load condition, or there is an inordinate level of power being input into the drying apparatus 1, the silicon carbide represents a significant load and may heat faster than the drying apparatus 1 is able to remove the heat that is generated. If this is the case, then assisted cooling must be provided and can be accomplished through a variety of cooling mediums such as air and water, but only when necessary.

As in the choke section 3*a*, when in the trap section 3*b*, each product P is securely retained by the holder 5 that is operationally connected to the conveyor belt 4. As illustrated in FIG. 1B, which is a plan view of the drying apparatus 1, the conveyor belt 4 and holders 5 travel along the flow direction and pass through the vestibule 3 as well as the microwave oven 2. Returning to FIG. 3, it can be seen that the product P is illustrated as being held in a horizontal direction such that a longitudinal axis of the product P is orthogonal, i.e., extends left to right, relative to an axis of the flow direction. While the illustrated arrangement of the product P is a preferred arrangement, it should be noted that it is within the scope of the present invention for the conveyor belt 4 and holders 5 to hold and convey the product P through the drying apparatus 1 such that the longitudinal axis of the product P is orthogonal in a top to bottom direction relative to the axis of the flow direction, as well as oblique relative to the axis of the flow direction FIGS. 4A and 4B illustrate a front elevation and an in-feed end view, respectively, of the paddlewheel section 3*c* of the vestibule 3.

The paddlewheel section 3*c* is the final stage in the process of attenuating the energy level of the microwave energy waves passing through the vestibule 3. Any residual microwave energy that cannot be attenuated by the choke section 3*a* and/or absorbed by the trap section 3*b* must be contained within the paddlewheel section 3*c*.

Figure 4A:
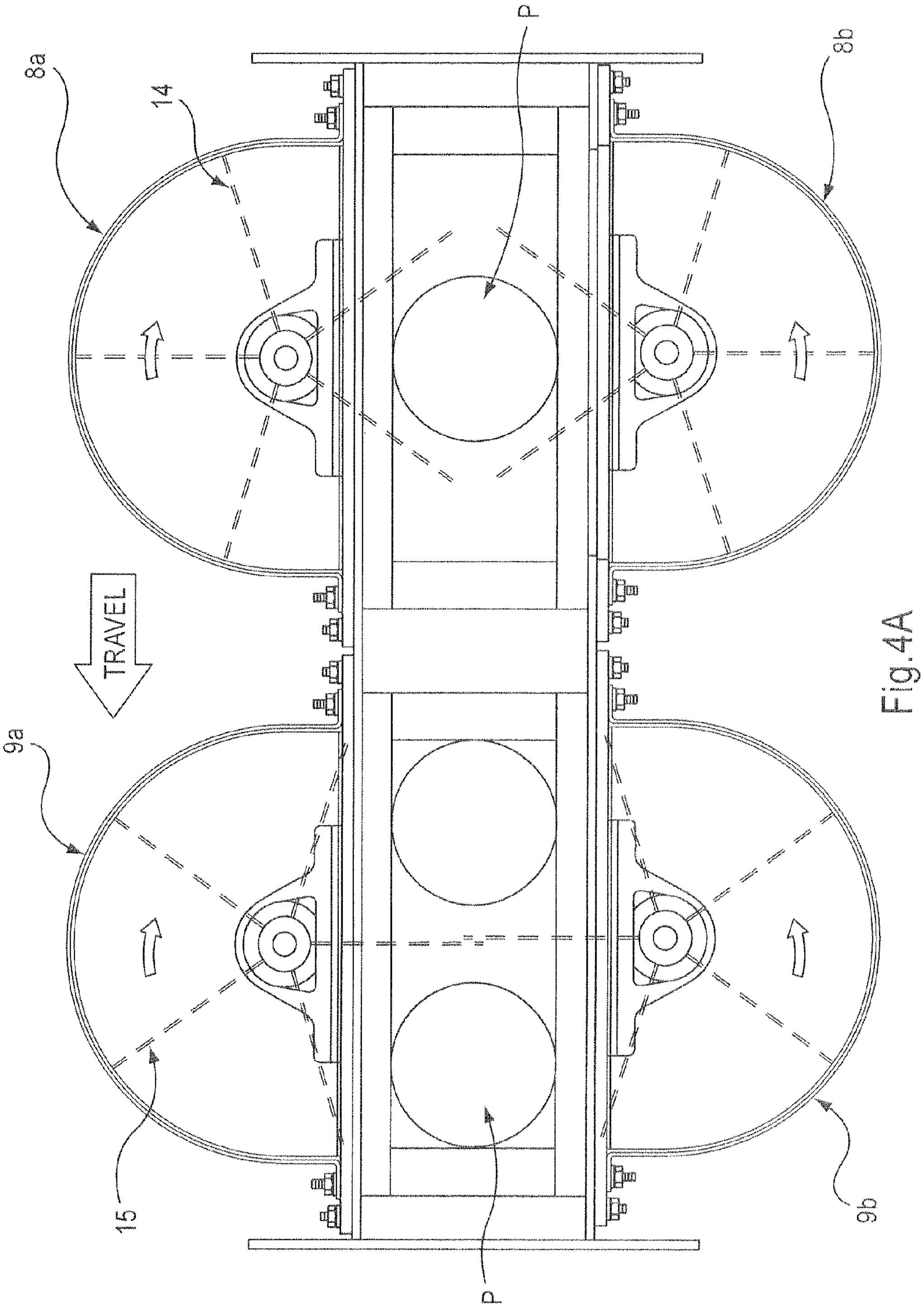
FIG. 4A is the front elevation of a paddlewheel section 3*c* of the vestibule.
Figure 4B:
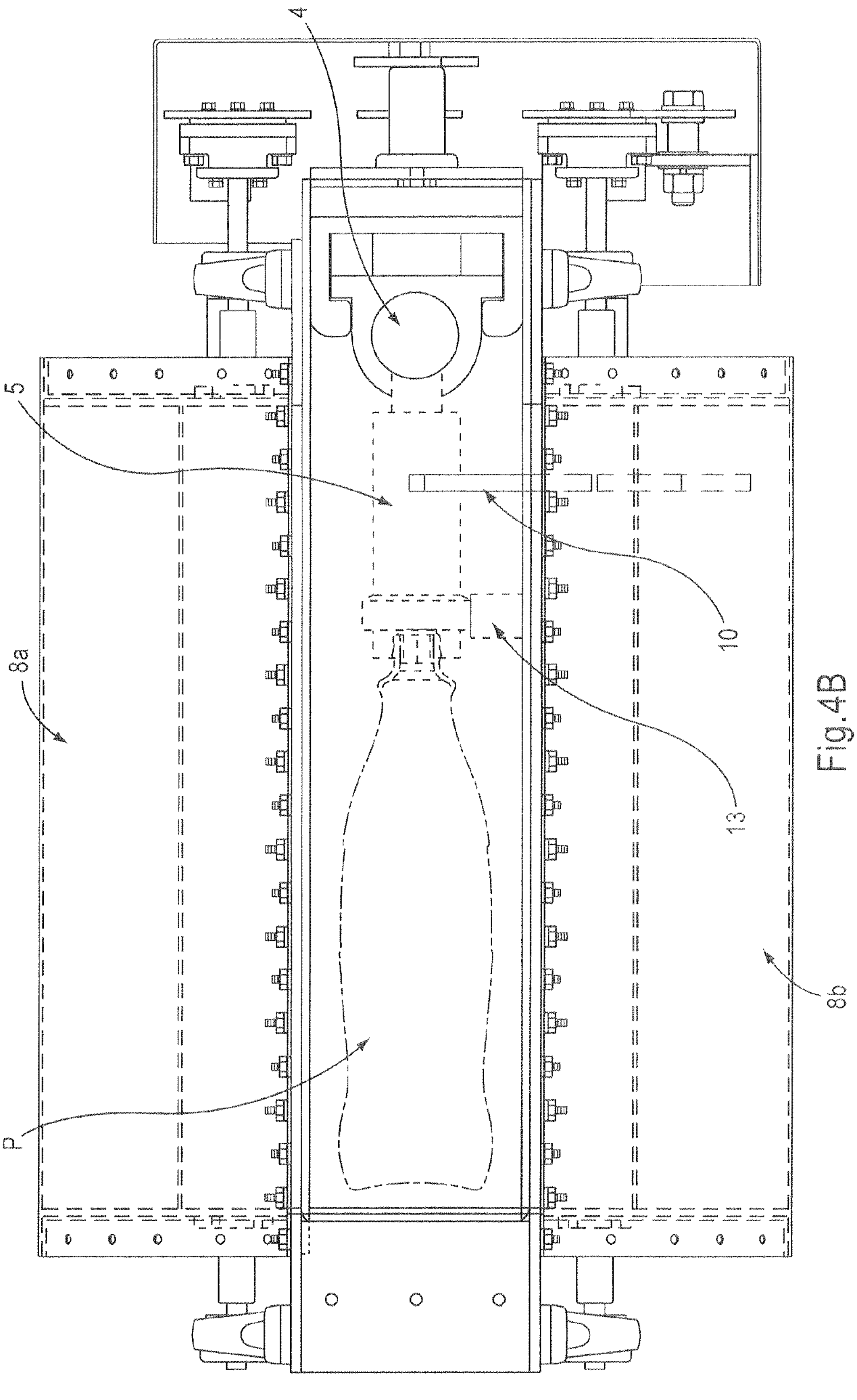
FIG. 4B is the in-feed end view of the paddlewheel section 3*c* of the vestibule.

As shown in FIG. 4A, the paddlewheel section 3*c* preferably includes at least two pairs of paddlewheels 8*a*, 8*b* and 9*a*, 9*b* arranged in series along the flow direction of the conveyor belt 4. The first set of paddlewheels, 8*a* and 8*b*, when viewed from an outermost end of the vestibule 3 that is most remote from the entrance 2*a* to the microwave oven 2, is the primary set 8 of paddlewheels. The next set of paddlewheels, 9*a* and 9*b*, is the secondary set 9 of paddlewheels. The dual and opposing paddlewheel structure is configured to keep the entrance (for vestibule 3) and exit (for vestibule 3') closed at all times while allowing for the continuous passage of product P there-through and to do so without touching a surface of the product P.

Each set of paddle 14 and 15 on the paddlewheels 8*a*, 8*b*, 9*a*, and 9*b* is made of a suitable metal or metal alloy that is capable of obstructing the microwave energy waves flowing in the paddlewheel section 3*c*.

The paddlewheels 8*a*, 8*b*, 9*a*, and 9*b* are configured to allow product P to pass through the paddlewheel section 3*c* via the conveyor belt 4 while maintaining an open end of the vestibules 3 and 3' closed at any time during the process of conveying the product P through the drying apparatus 1.

In the exemplary embodiment illustrated in FIG. 4A, the primary 8*a* and secondary 9*a* paddlewheels rotate clockwise while the flow direction is right to left. It is also within the scope of the invention for the primary 8*b* and secondary 9*b* set of paddlewheels to rotate counterclockwise, then the conveyor belt 4 would move in a right to left direction.

Rotation of the primary 8 and secondary 9 sets of paddlewheels is synchronized by a synchronization device such as a timing belt, a chain, or gears to insure the proper closing of the vestibule opening while the product P are traveling through the paddlewheel section 3*c*. Furthermore, the synchronization device is configured such that while the primary 8 set of paddlewheels are keeping the vestibule opening closed, the secondary 9 set of paddlewheels are in an open state, that is, the passageway there-through is not closed. Similarly, when the primary 8 set of paddlewheels are in an open state, the secondary 9 set of paddlewheels are keeping the vestibule opening closed. As such, the paddlewheels 8*a*, 8*b*, 9*a*, and 9*b* prevent the microwave energy waves from leaking out of the open end of the vestibule 3 without touching the product P passing through the paddlewheel section 3*c*.

Figure 5:
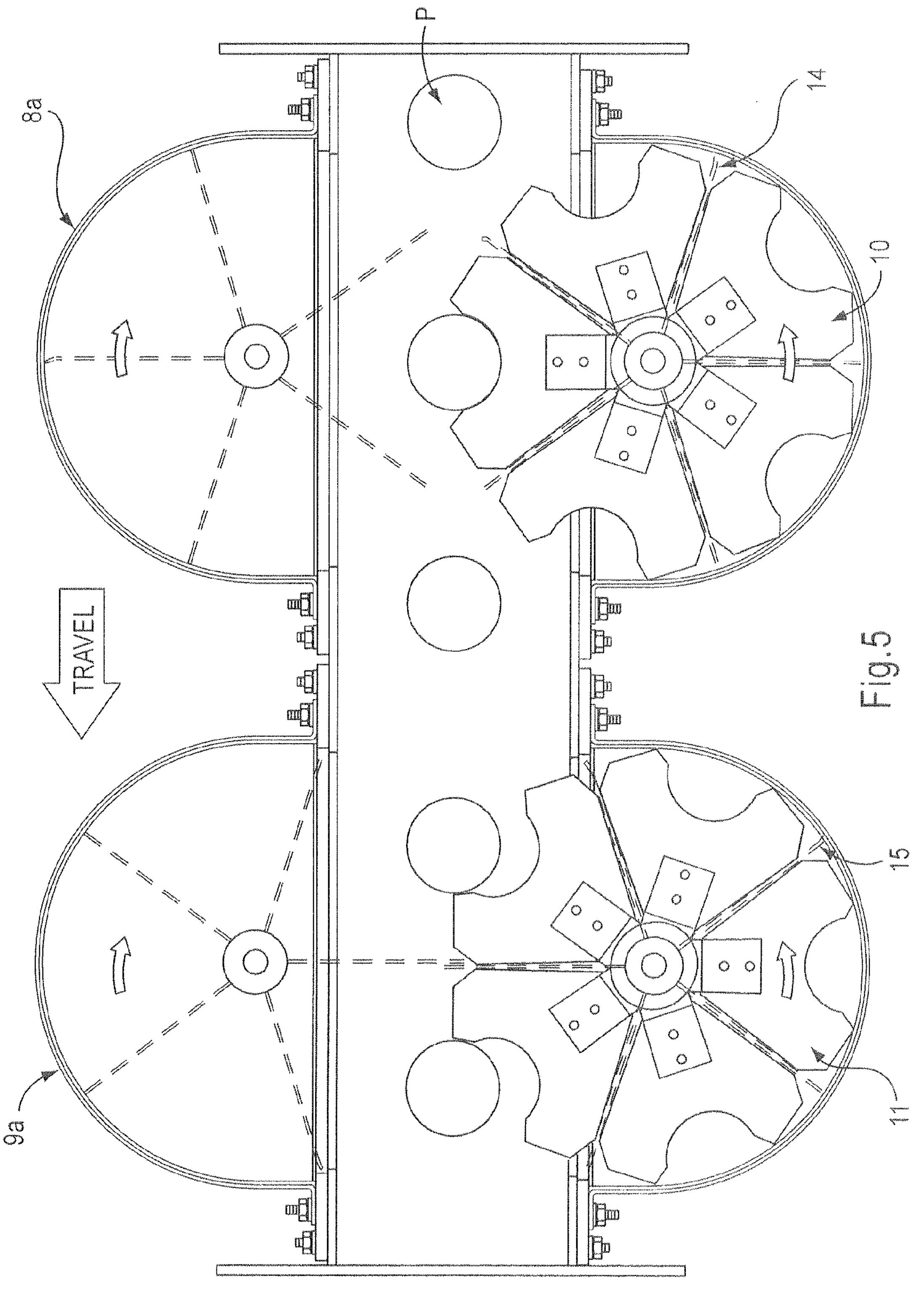
FIG. 5 is the cross sectional view of the paddlewheel section 3*c* with cam devices incorporated therein.

FIG. 5 illustrates a cross-sectional view of the paddlewheel section 3*c* with each set 8 and 9 of paddlewheels having a cam 10 and 11, respectively, which is attached to a corresponding paddlewheel 8*b*, 9*b* or 8*a*, 9*a*. Each cam 10 and 11 engages a corresponding product holder 5 and rotates the paddlewheel according to the traveling speed of the product P through the paddlewheel section 3*c*.

The product P is carried by the conveyor belt 4 that includes a series of links comprised of product holders 5 pinned together, captured and guided through the drying apparatus 1 (vestibules 3 and 3' and microwave oven 2 included) by an extruded aluminum conveyor rail. The product holders 5, with the conveyor belt 4, transport the product P through the vestibules 3 and 3' and oven 2, with the paddlewheel section 3*c*, trap section 3*b*, and choke section 3*a* forming a link in a continuous chain.

The product holders 5 can be made from any machinable microwave transparent material which has the necessary mechanical and thermal properties to satisfactorily endure the process conditions. While many materials are suitable and can attain the desired objectives of the inventive vestibules 3 and 3', the preferred material from which the product holders 5 should be manufactured is Teflon™.

In addition to transport, the holders 5 provide continuous process rotation to the product P by capturing the product P at the holder's outermost extremity in a gripping collar 12 (FIG. 2). The holder 5 is knurled on an outer surface and rests on a continuous aluminum rail 13 extending through the oven 2 and vestibule sections 3*a*-3*c*, parallel to the conveyor guide rail. As the conveyor belt 4 is driven forward, contact between the now moving holder 5 and the stationary aluminum rail 13 forces the holder 5, and subsequently the product P, to rotate.

In addition to providing rotation, the collar is also a spring-loaded, product-capture device. When the collar is pulled back against spring tension from a fully extended position, the retraction motion opens a spring-loaded clamping device and exposes the conically-shaped holder core.

Once the product P is inserted onto the holder core, the retracted collar is released causing the spring-loaded clamping device to capture the product P in a verifiable position for rotation and transport. The product P is then moved forward and enters the entrance of the vestibule 3. Entry through the paddlewheel section 3*c* requires synchronization between the product P and the paddle wheels 8, 9.

To synchronize the product P with the paddle wheels 8*a*, 8*b*, 9*a*, 9*b*, a series of cams are provided between each paddle 14, 15 Each cam is machined in such a way that the cam will engage the holder firmly as the conveyor is moving the products through the paddle wheel section. By doing so, the paddlewheel rotation is driven as the direct result of belt movement with verifiable co-location to product position.

Since the entire assembly is ultimately driven by the main conveyor, all motion and relative position is simultaneously synchronized.

Once through the paddlewheel section 3*c*, the product P passes into the trap section 3*b*, and then the choke section 3*a* before ultimately entering the microwave oven 2 where the microwave energy is applied to the product P. The product P then exits the microwave oven 2 and passes through identical choke, trap, and paddlewheel section of the exit vestibule 3' in a reverse order as when the product P was passing through the entrance vestibule 3.

In other words, once through the microwave oven 2, the product P passes through the exit vestibule 3' in reverse order compared to the previously described entrance vestibule 3. As the product P clears the paddlewheel section of the exit vestibule 3', the product P travels on to the next process stage and is eventually removed from the conveyor belt 4. The continuous belt 4 then cycles back toward the entrance of the entrance vestibule 3 for loading of more product P and the sequence is repeated.

In view of the above, the vestibules 3 and 3' functions to prevent or substantially attenuate the amount of microwave radiation/energy that is leaked into the environment through the open end of each vestibule 3 or 3'.

While there has been described herein what are at present considered to be preferred embodiments of the present invention, it will be understood that various modifications may be made thereto, and it is intended that the appended claims cover all such modifications as fall within the spirit and scope or the present invention.

What is claimed:

1. A vestibule abutting a source of radiating wave energy to form a drying apparatus, wherein the vestibule encloses an opening formed in the radiating wave energy source, the vestibule comprising:

a choke section abutting the radiating energy source and comprising a first choke section opening aligned with an opening formed in the radiating energy source and a second choke section opening defined opposite the first choke section opening;

a trap section abutting the choke section and comprising a first trap section opening aligned with the second choke section opening and a second trap section opening defined opposite the first trap section opening; and a paddlewheel section abutting the trap section and comprising a first paddlewheel section opening aligned with the second trap section opening, a second paddlewheel section opening defined opposite the first paddlewheel section opening, and at least two pairs of paddlewheels arranged in series between the first and second paddlewheel section openings, wherein a first pair of paddlewheels rotate out of phase with a second pair of paddlewheels to maintain the first paddlewheel section opening is always closed relative to an ambient atmosphere located outside of the second paddlewheel section opening.

2. The vestibule according to claim 1, wherein each of the first and second paddlewheels comprises a first paddlewheel connected to a second, opposing paddlewheel by an axle, each of the first and second paddlewheels including a plurality of paddles disposed along an out circumference thereof.

3. The vestibule according to claim 2, wherein the first paddlewheel rotates clockwise and the second paddlewheel rotates counterclockwise.

4. The vestibule according to claim 2, wherein the first and second paddlewheels both rotate either clockwise or counterclockwise.

5. The vestibule according to claim 2, wherein the axles of the first and second paddlewheels are parallel to each other.

6. The vestibule according to claim 2, wherein each paddle comprises a material that obstructs radiating wave energy passing through the paddlewheel section to attenuate the passage of radiated wave energy there-through.

7. The vestibule according to claim 6, wherein the material is a metal and a metal alloy.

8. The vestibule according to claim 1, wherein an entire inner surface of the trap section is covered with a radiated wave energy absorptive material that attenuates the passage of radiated wave energy there-through.

9. The vestibule according to claim 8, wherein the radiated wave energy absorptive material includes at least one silicon carbide-based composition and air.

10. The vestibule according to claim 1, wherein an outer surface of the trap section is cooled by a cooling agent.

11. The vestibule according to claim 1, wherein the choke section includes a plurality of quarter wave choke devices arranged in a series to define a network of quarter wave choke devices that attenuate the passage of radiated wave energy there-through.

12. The vestibule according to claim 11, wherein the quarter wave choke devices comprise one of metal, such as stainless steel or aluminum.

13. The vestibule according to claim 1, wherein the radiating wave energy source is a microwave oven and the radiated wave energy is microwave energy waves.

14. The vestibule according to claim 1, wherein a conveyor belt holding at least one ceramic or glass-based product passes through the paddlewheel section, the trap section and the choke section to or from the radiating wave energy source.

* * * * *